(12) United States Patent
Erdos et al.

(10) Patent No.: US 9,424,740 B2
(45) Date of Patent: Aug. 23, 2016

(54) MONITORING SYSTEM AND METHOD

(75) Inventors: Akos Erdos, Leeds (GB); Jeno Balazs, Budapest (HU); Peter Csato, Budapest (HU); Gabor Szabo, Pest (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 622 days.

(21) Appl. No.: 13/604,974

(22) Filed: Sep. 6, 2012

(65) Prior Publication Data

US 2013/0241744 A1 Sep. 19, 2013

(30) Foreign Application Priority Data

Sep. 6, 2011 (HU) .................................. 1100486

(51) Int. Cl.
    *G08C 15/06* (2006.01)
    *G08C 19/00* (2006.01)
    *H04Q 9/00* (2006.01)

(52) U.S. Cl.
    CPC ............... *G08C 19/00* (2013.01); *H04Q 9/00* (2013.01); *H04Q 2209/10* (2013.01); *H04Q 2209/43* (2013.01)

(58) Field of Classification Search
    CPC .................................................... G01D 4/004
    USPC ...... 340/870.02; 702/188; 701/532; 600/300
    See application file for complete search history.

(56) References Cited

U.S. PATENT DOCUMENTS

| 3,882,277 A | 5/1975 | DePedro et al. |
| 5,522,396 A | 6/1996 | Langer et al. |
| 6,093,146 A * | 7/2000 | Filangeri ................. 600/300 |
| 6,243,413 B1 | 6/2001 | Beukema |

(Continued)

FOREIGN PATENT DOCUMENTS

| CN | 101932131 | 12/2010 |
| CN | 101938514 | 1/2011 |

(Continued)

OTHER PUBLICATIONS

Hou et al., "Minimizing 802.11 Interference on Zigbee Medical Sensors", BodyNets '09 Proceedings of the Fourth International Conference on Body Area Networks, Article No. 5, Apr. 1, 2009.

(Continued)

*Primary Examiner* — Benjamin C Lee
*Assistant Examiner* — Israel Daramola
(74) *Attorney, Agent, or Firm* — GE Global Patent Operation; Marc A. Vivenzio

(57) ABSTRACT

A system for monitoring an area is provided. The system comprises a plurality of stationary sensors that can sense events and comprise a wireless output signal broadcast capability for transmitting output signals from the stationary sensors by a wireless communication protocol. The system further comprises gateway units connected to a wired backbone network and configured to transmit information relating to the output signals of the stationary sensors by a wired communication protocol, and a base station connected to the wired backbone network configured to receive the information transmitted by the gateway units on the wired communication protocol and to time-stamp the events signaled by the stationary sensors. The monitored area comprises sub-areas, and a group of stationary sensors are assigned to each of the sub-areas and to a gateway unit for directly receiving the output signals from the group of stationary sensors.

12 Claims, 2 Drawing Sheets

(56) References Cited

U.S. PATENT DOCUMENTS

| | | |
|---|---|---|
| 6,336,900 B1 | 1/2002 | Alleckson et al. |
| 6,773,396 B2* | 8/2004 | Flach et al. ............ 600/300 |
| 6,873,256 B2 | 3/2005 | Pedersen |
| 7,113,763 B2 | 9/2006 | Heinonen et al. |
| 7,345,998 B2 | 3/2008 | Cregg et al. |
| 2002/0126651 A1* | 9/2002 | Ikeda et al. ............ 370/349 |
| 2005/0254652 A1* | 11/2005 | Engler et al. ............ 380/270 |
| 2006/0154642 A1 | 7/2006 | Scannell |
| 2008/0091345 A1* | 4/2008 | Patel et al. ............ 701/208 |
| 2009/0069642 A1* | 3/2009 | Gao et al. ............ 600/300 |
| 2009/0081951 A1 | 3/2009 | Erdmann et al. |
| 2009/0088605 A1* | 4/2009 | Ross et al. ............ 600/300 |
| 2011/0004446 A1* | 1/2011 | Dorn et al. ............ 702/188 |
| 2011/0286386 A1* | 11/2011 | Kellam ............ H04W 28/06 370/328 |
| 2012/0178370 A1* | 7/2012 | George ............ 455/41.3 |
| 2012/0242501 A1* | 9/2012 | Tran et al. ............ 340/870.02 |

FOREIGN PATENT DOCUMENTS

| | | |
|---|---|---|
| JP | 2003331371 A | 11/2003 |
| KR | 20080061497 | 7/2008 |
| WO | 03088830 | 10/2003 |
| WO | 2010150031 | 12/2010 |
| WO | 2011012914 | 3/2011 |

OTHER PUBLICATIONS

Yitran Technologies Ltd. "Yitran—ZigBee Powerline for Seemless Connectivity", website: http://www.yitran.com/index.aspx?id=3354, pp. 3, dated Oct. 13, 2010.

Unofficial Translation of Hungarian Search Report from HU Application No. P1100486 dated Feb. 19, 2013.

* cited by examiner

MONITORING SYSTEM AND METHOD

CROSS-REFERENCE TO RELATED APPLICATIONS

This application claims foreign priority benefits under 35 U.S.C. §11910 co-pending Hungarian Patent Application No. P1100486, filed Sep. 6, 2011, which is hereby incorporated by reference in its entirety as part of the present disclosure.

BACKGROUND OF THE INVENTION

The subject matter disclosed herein relates to a monitoring system and method, more particularly to a monitoring system and method with hybrid wireless and wired communication. The monitoring system can be used as a medical monitoring system to monitor elderly people or people with neurological diseases in a home environment or in an assisted hymn facility.

The currently widely used low power radio networks (Bluetooth. ZigBee, etc) used for monitoring are using mesh architecture or in special cases tree topology, where each device has only one parent. In these topologies the response time and data throughput are not guaranteed and there is no solution to prioritize the messages. Furthermore, the communication quality indicators are highly depending on the actual network topology and on the placement of the devices in the network hierarchy. This behavior of the current low power radio networks does not allow providing time critical services such as activity monitoring, emergency alarm signaling or voice communication.

There is a continuously growing need for monitoring systems in apartments of elderly people that enables patients to measure vital signs without having to go to the medical doctor. These measurable vital signs comprise blood glucose, blood pressure, ECG, body weight etc. The number of devices enabling medical measurements at home is also continuously growing. It is preferred to measure vital signs without disturbing the patient or even without the need of patient interaction. Such systems can measure patient movements using motion sensors or ECG if the patient sits in an armchair equipped with an ECG measurement unit. The sensor devices shall be designed to be wireless devices. This is not only a need of today's technology but enables the patient to measure vital signs far from a central unit.

Monitoring systems and methods e.g. for the above purposes are disclosed in U.S. Pat. No. 3,882,277, U.S. Pat. No. 5,522,396, U.S. Pat. No. 6,093,146, U.S. Pat. No. 6,336,900 B1, U.S. Pat. No. 6,873,256 B2, US 2009/0081951 A1, WO 03/088830 A1. WO 2010/150031 A1 and WO 2011/012914 A1.

FIG. 1 demonstrates an example ZigBee based wireless medical monitoring system. The ZigBee devices are categorized into three groups: network coordinator 10 (NC) which maintains the radio network, routers R1 . . . R5 which are required for the communication to find the path between the sender and receiver devices, and the end devices or sensors S1 . . . S9 which provide the medical or event data.

The end devices can be either stationary or moving, worn by the patient. The number of sensors necessary to monitor a patient depend on the characteristics of the apartment (e.g. number of rooms or sub-areas) and on other circumstances (e.g. illness or status specific medical signals). The known monitoring system consists of a monitoring center 11 where the network coordinator 10 is installed. The rooms or sub-areas A1, A2, A3 are: patient's apartments. In sub-area A1 there are four sensors and two routers, in sub-area A2 there are three sensors and one router and in sub-area A3 there are two sensors and two routers.

This example highlights the weakness point of the known system: different sensors have different communication path lengths, though the response time can vary in a wide range and highly depends on where the sensor is connected to the network. In FIG. 1 the sensors S8 and S9 can communicate via three routers R4, R2, R1 with the network coordinator 10 which causes at least three times propagation delay in the communication.

A further problem is the arriving order of sequential events received by the monitoring center 11. The signals of sensors closer to the network coordinator 10 will be detected earlier than those of other sensors because of the different communication path lengths.

Another important problem is the different data transmission loads of the routers. In the lower layers of the network tree structure the traffic is significantly lower than in the upper layers. For instance in the example of FIG. 1, routers have to serve different numbers of sensors. From maintainability and scalability standpoint the known network architecture is not practical and economical.

Furthermore, lamer radio networks are more error sensitive. If one node fails in a tree network topology, its sub tree will be inaccessible, in a mesh network the communication has to find a different route, and it could generate a large traffic on the network. The remote maintenance operations like firmware updates and device restarts especially in higher network levels could prevent the normal operation for a long period which is not acceptable in emergency signaling applications or other mission critical applications. The tree and mesh networks are very sensitive to the failure mode when one device is continuously transmitting and blocking the radio communication in a channel.

Thus, there is a particular need for a monitoring system and method eliminating the shortcomings of known techniques. There is also a need for a system and a method which can record the monitored events in a right timely order with less expensive transfer and end devices.

BRIEF DESCRIPTION OF THE INVENTION in one embodiment, a system for monitoring of an area is provided. The system comprises a plurality of stationary sensors that can sense events and comprise a wireless output signal broadcast capability for transmitting output signals from the stationary sensors by a wireless communication protocol. The system further comprises gateway units for receiving the output signals of the stationary sensors that are connected to a wired backbone network and configured to transmit information relating to the output signals of the stationary sensors by a wired communication protocol on the wired backbone network. The system further comprises a base station connected to the wired backbone network, which is configured to receive the information transmitted by the gateway units on the wired communication protocol and to time-stamp the events signaled by the stationary sensors. The monitored area comprises sub-areas, and a group of stationary sensors are assigned to each of the sub-areas and to a gateway unit directly receiving the output signals of the group of stationary sensors.

In another embodiment, a method for monitoring of an area is provided. The method comprises applying a plurality of stationary sensors comprising wireless output signal broadcast capability, and transmitting output signals from the stationary sensors by a wireless communication protocol to a plurality of gateway units, which are connected to a wired backbone network and configured to transmit information relating to the output signals of the stationary sensors by a wired communication protocol on the wired backbone network to a base station. The plurality of stationary sensors can sense events. The monitored area comprises sub-areas, to each of which is assigned a group of stationary sensors and a gateway unit directly receiving the output signals of the stationary sensors; wherein the events signaled by the stationary sensors to the base station are time-stamped by the base station.

BRIEF DESCRIPTION OF THE DRAWINGS

The subject matter will now be described in detail with reference to the enclosed drawings, in which.

DETAILED DESCRIPTION OF THE INVENTION

Figure 1:
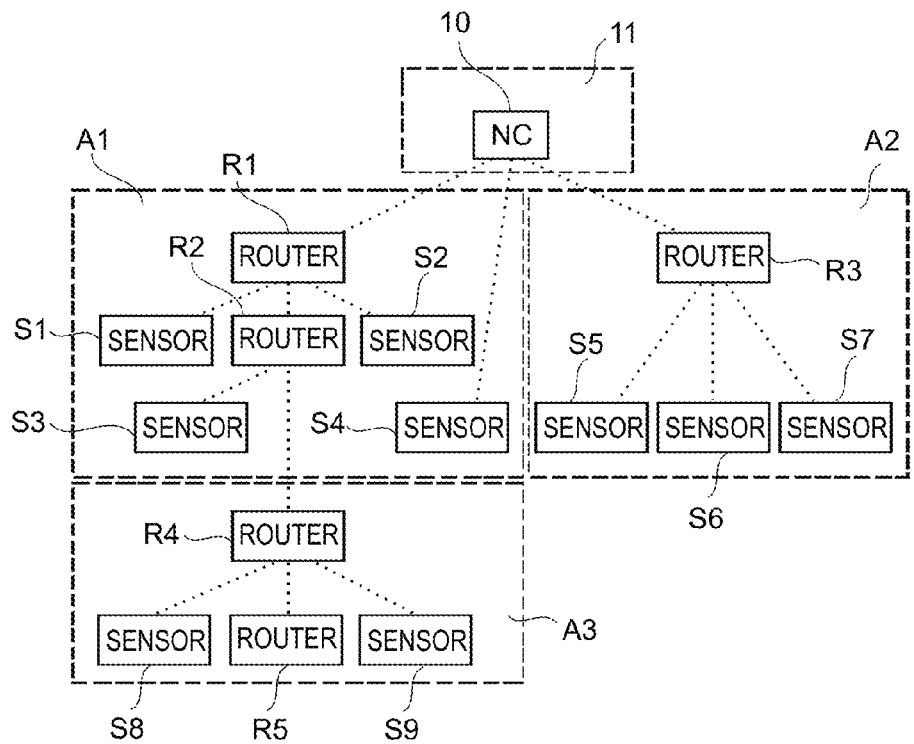
FIG. 1 illustrates a schematic network architecture of a prior art low power radio network for medical monitoring.
Figure 2:
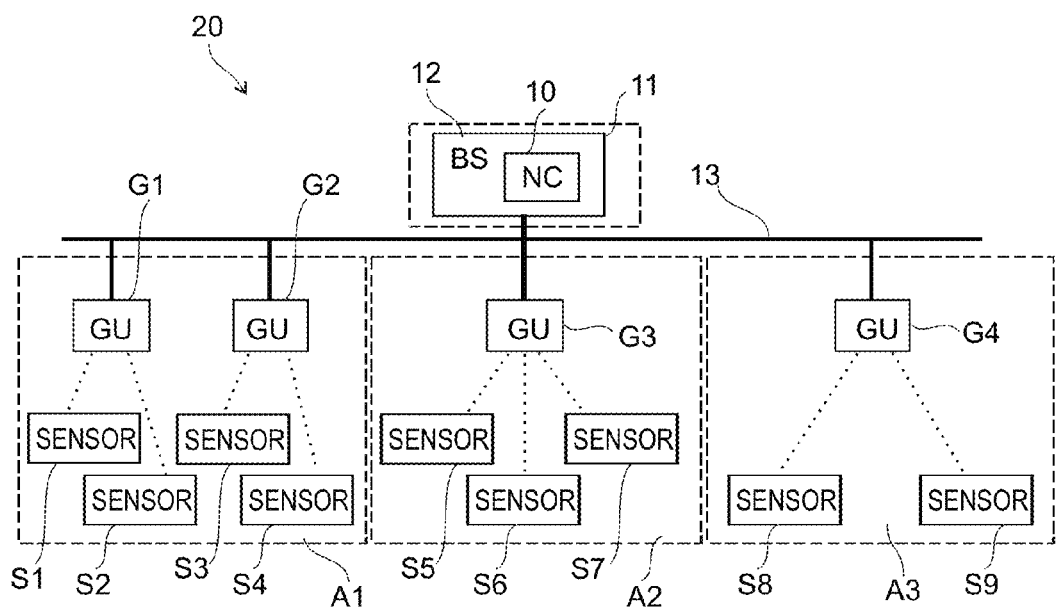
FIG. 2 shows a schematic diagram of one embodiment of the architecture of the hybrid wireless/wired network for medical monitoring, in accordance with the subject matter described herein.

Referring now to FIG. 2, an embodiment of a monitoring system 20 network topology is shown. The system 20 for monitoring of an area comprises a plurality of stationary sensors S1 . . . S9 comprising wireless output signal broadcast capability for transmitting output signals from said stationary sensors S1 . . . S9 by a wireless communication protocol. Of course, the stationary sensors S1 . . . S9 can also be able to receive wireless communication, e.g. for maintenance, calibration or control purposes.

The stationary sensors S1 . . . S9 may be motion sensors fixed to the structure of a facility to be monitored. The system 20 further comprises a plurality of gateway units G1 . . . G4 for receiving the output signals of the stationary sensors S1 . . . S9, which gateway units G1 . . . G4 are connected to a wired backbone network 13 and are adapted to transmit information relating to the output signals of the stationary sensors S1 . . . S9 by a wired communication protocol on the wired backbone network 13. The information relating to the output signals of the stationary sensors S1 . . . S9 may be the data contained by the output signals i.e. information relating to the events signaled by the stationary sensors S1 . . . S9.

The system 20 also comprises a base station 12 (BS) connected to the wired backbone network 13 and, receiving, the information transmitted by the gateway units G1 . . . G4 on the wired communication protocol. The plurality of stationary sensors S1 . . . S9, e.g. motion sensors, can be operable to sense events by detecting if a motion event happens in the target area. The area comprises sub-areas A1 . . . A13 to each of the sub-areas A1 . . . A3 a group of stationary sensors S1 . . . S9 is assigned, and the group is assigned to a gateway unit G1 . . . G4 directly receiving the output signals of the group. In the context of the subject matter disclosed herein, a group comprises at least one stationary sensor S1 . . . S9. The base station 12 is adapted to time-stamp the events signaled by the stationary sensors S1 . . . S9. In the context of the subject matter described herein, time-stamping can mean all possible: solutions for assigning time and/or date and/or sequence information to data relating to sensed events. Wireless communication is depicted by dotted lines, while wired communication is depicted by solid lines in FIG. 2.

A technical effect that may be realized in the practice of some embodiments of the described system 20 is that all stationary sensors S1 . . . S9 can be at an equal distance (from the network topology point of view) from the base station 12. Therefore, sequential events will be time-stamped in the right sequence order by the base station 12. This technique allows to apply low cost stationary sensors S1 . . . S9 and gateway units G1 . . . G4 (without time-stamping capability), while the right time-stamping of the events is ensured. This is especially advantageous in home or assisted living monitoring systems, where monitored events can appear in a congested manner. An example of such congested events is when stationary sensors S1 . . . S9 generate a signal at waking or meal-time.

In an embodiment, the wireless communication protocol is ZigBee, which is often used in telemetry systems. ZigBee is based on the IEEE 802.15.4 standard specifying the physical layer and media access control for low-rate wireless personal area networks. The ZigBee network usually consists of one network coordinator 10, full function devices (FED, also known as routers), being the gateway units G1 . . . G4 in the embodiment depicted in FIG. 2, and reduced function devices RFD, also known as end devices), being the stationary sensors S1 . . . S9 in the embodiment shown. The network coordinator 10 is unique on the network and only one instance is allowed in one network. Both the FED and RED devices can receive and send signals but the FED can have child devices, while the RFD is on the bottom level (at the end) of the hierarchy. An important requirement of the FFDs is that they need continuous power supply so in most of the cases they are plugged into the wall outlet (power line).

As shown in the embodiment of FIG. 2, the base station 12 can comprise the network coordinator 10 and the gateway units G1 . . . G4 can be capable to communicate the output signals of the stationary sensors S1 . . . S9 by the ZigBee wireless communication protocol to the base station 12 in the case of a failure of the wired communication on the wired backbone network 13. In this case, the gateway units G1 . . . G4 are functioning as ZigBee routers.

The ZigBee network is characterized—among its topology—by the network channel and the personal network identification number (PAN ID). Network channel ranges from channel 11 (2405 MHz) to 26 (2480 MHz) and the PAN ID is a unique 16-bit number. Two networks on the same channel with different PAN ID may exist but is not recommended if there is a free, noiseless channel available.

ZigBee networks can operate in beacon and in non-beacon mode. In non-beacon-enabled networks ZigBee routers typically have their receivers continuously active, requiring a more robust power supply. However, this allows for heterogeneous networks in which some devices receive continuously, while others only transmit when an external stimulus is detected. In beacon-enabled networks, the ZigBee routers transmit periodic beacons to confirm their presence to other network nodes. Nodes may sleep between beacons, thus lowering their duty cycle and extending their battery life. Beacon intervals may range from 15.36 milliseconds (at 250 kbit/s) to 786.432 seconds (at 20 kbit/s).

However, low duty cycle operation with long beacon intervals requires precise timing, which can conflict with the need for low product cost.

In one embodiment, the wired communication protocol is Power Line Networking. The Power Line Networking can be referred to in many ways, including Power Line Communication or Power Line Carrier (both abbreviated as PLC), Power Line Digital Subscriber Line (PDSL), mains communication, power line telecom (PLT), power line networking (PLN). Broadband over Power Lines (BPL) or HomePlug. All these terms relate to carrying data on a conductor also used for electric power transmission.

A technical effect of Power Line Networking is that it can be used at every stage of the voltage transmission, at high voltage transmission lines and lower voltages as well. Care must be taken because transformers typically prevent proper signal propagation. Since the power wiring system was originally intended for transmission of AC power, in conventional use, the power wire circuits have only a limited ability to carry higher frequencies. The propagation problem limits the usage of power line communication.

The speed of the PLNs is comparable to older, common wireless and wired communication systems: HomePlug, 1.0 has a data rate of 14 Mbps, HomePNA 2.0 has 10 Mbps, while IEEE802.11b has 11 Mbps and IEEE802.11 as has 55 Mbps. For a comparison, the ZigBee network has a theoretical data rate of 250 kbit/s.

Any suitable modulation type can be used on the PLN. e.g. Orthogonal Frequency Division Multiplex (OFDM), Gaussian Minimum Shift Keyring (GMSK), Frequency Shift Keying (FSK), Phase Shift Keying (PSK) or Quadrature Amplitude Modulation (QAM). An important parameter of the communication channel is the signal-to-noise ratio (SNR=Received power/Noise power). The signal clarity is highly affected by the devices (loading impedances) connected to the transmission line (channel). This is the reason why it is problematic to use PLNs in large distances. For the present monitoring system 20 and method of operation, however, no large distance PLNs are necessary. If the monitoring system 20 is used for an assisted living monitoring environment, the monitored area can usually comprise a block of flats or some block of flats.

A technical effect that max be realized in the practice of some embodiments of the described system 20 and method is that weaknesses of known low power wireless networks are reduced or eliminated. The response time varies less across the network, which enhances the likelihood of a correct receive order of sequential events. The system 20 addresses this issue in allowing one to build time-critical low power wireless networks, especially for home and assisted living. Another technical effect is that the reliability of wireless networks can be extended by making the network hybrid, i.e. comprising, both wireless and wired transmission possibilities.

The system 20 can comprise the following devices: the high bandwidth, deterministic wired backbone network 13 and the gateway units G1 . . . G4. The stationary sensors S1 . . . S9 communicate with the base station 12 through the gateway units G1 . . . G4 and wired backbone network 13. This results a network topology, in which each stationary sensor S1 . . . S9 has substantially the same communication path length to the base station 12. The possible size of the system 20 depends on the backbone network 13 speed or the response time required by the application. The backbone network 13 can be real-time Ethernet or a type of Power Line Communication, the CAN-over-PLC. The choice can depend on the environment where the system 20 is installed. PLN has the advantage that the whole system 20 can be installed without adding new wiring or cabling to a building or facility.

Figure 3:
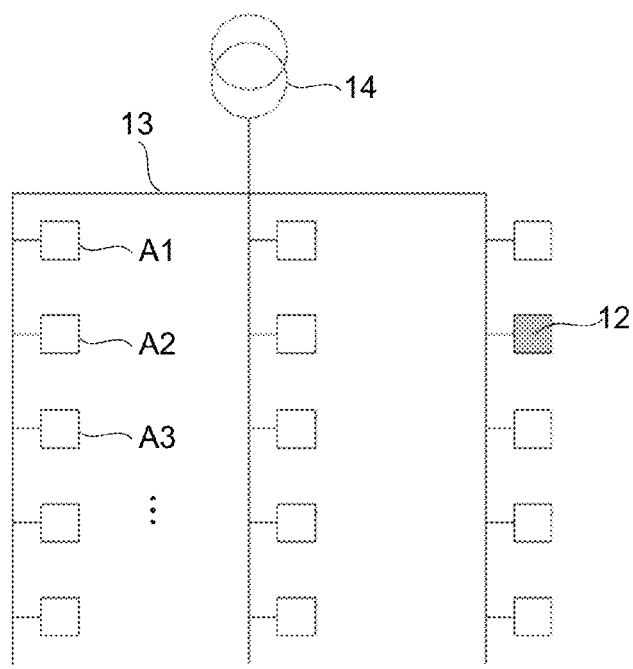
FIG. 3 shows a schematic example of a power supply network, in accordance with the subject matter described herein.
Figure 4:
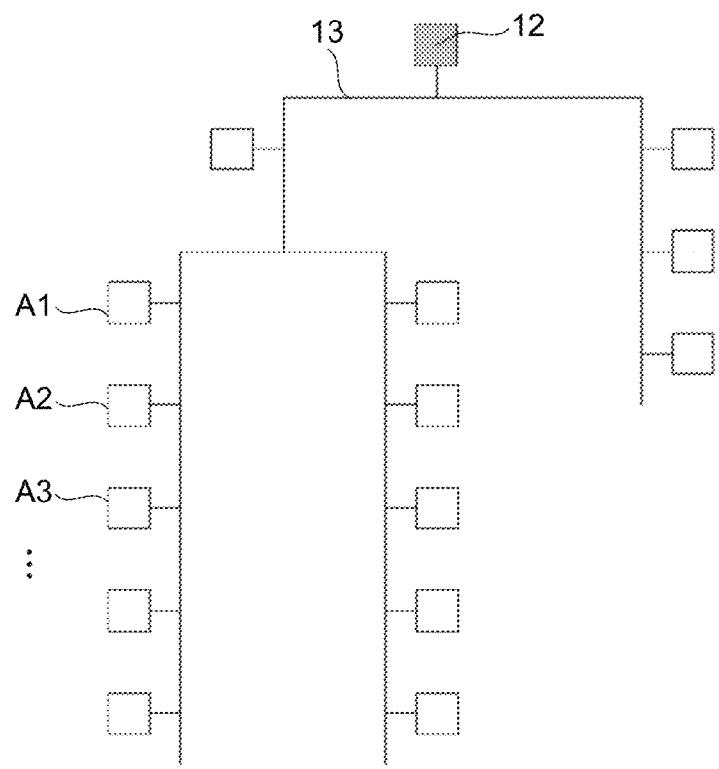
FIG. 4 illustrates a power line communication network; in accordance with the subject matter described herein.

The CAN-over-PLC can be used as the controller area network communication over the power line, being the backbone network 13 in FIGS. 2 to 4. The CAN protocol is a CSMA/CA (Carrier Sense Multiple Access with Collision Avoidance) type communication and provides prioritized connection without data loss. The prioritization is based on the CAN message ID where lower ID number represents a higher priority.

As mentioned above, the monitored area, e.g. a building has a number of sub-areas A1 . . . A3, e.g. rooms. A group of stationary sensors S1 . . . S9 are assigned to each sub-area A1 . . . A3. This group only contains a limited number of stationary sensors S1 . . . S9. The maximum allowed response time depends on the medical application. For instance a two way voice communication requires different response time limit than a movement monitoring. A fixed percentage of the bandwidth can be reserved for mobile and orphan devices.

Each group has its ° ANTI radio channel that is different from the neighbors' ones to decrease the disturbance and has an own personal network identification number (PAN ID) for the device membership control. The wireless radio group is connected to the base station 12 via the gateway units G1 . . . G4 and the wired backbone network 13. The main gateway function is to convert the wireless communication packets to wired and vice versa. The use of the ZigBee protocol on the wired network is not efficient because the ZigBee protocol itself uses a significant amount of data. The typical protocol efficiency is around 20 percent which means that 80 percent of the transmitted data is used by the protocol. The protocol efficiency further decreases if the amount of data decreases. Therefore, in one of the embodiments of the system 20 and method, the gateway units G1 . . . G4 extract the real data (what is called cluster in ZigBee) from the ZigBee packets obtained from the stationary sensors S1 . . . S9, and only the real data is transmitted to the base station 12.

The network coordinator 10 of the groups of stationary sensors S1 . . . S9 can be a network manager application running on the base station 12. The network manager can automatically assign the stationary sensors S1 . . . S9 to the individual groups, optimize the group-membership to keep the network responsive and handle eventual mobile devices. It can also manage the associations of the stationary sensors S1 . . . S9 with patients and can localize the gateway unit G1 . . . G4 to be used in the communication with the given stationary sensor S1 . . . S9. This function is important when a caregiver has to quickly find a patient or the stationary sensor S1 . . . S9 in a big building. The gateway units G1 . . . G4 periodically report the wireless network load to the network manager and it can point the problematic radio groups to the staff before the network becomes instable or dysfunctional. The gateway units G1 . . . G4 continuously measure the link quality of the stationary sensors S1 . . . S9 and generate warning messages to the network manager when the quality is lower than a limit, in such a case, the network manager can relocate a stationary sensor S1 . . . S9 to another gateway unit G1 . . . G4 or notify the staff. This dynamic network optimization and problem detection feature is a big advantage of the improved system and significantly increases the robustness thereof.

At start, a gateway unit G1 . . . G4 can choose a free radio channel from the available ones and informs the network manager about the selected channel. The search mechanism is called energy detection scan in the ZigBee standard and is based on the received signal power measurement in the channel's frequency range.

At startup, the stationary sensors S1 . . . S9 check the available radio groups with the standard beacon request and connect to the associated ones. If there is no stored association or the associated gateway unit G1 . . . G4 is not available, the stationary sensor S1 . . . S9 turns itself into orphan mode and connects to the closest radio group. The network management application detects this change and associates it to the current gateway unit G1 . . . G4 or relocates it to a neighbor where free communication capacity is available, to optimize the network load. In orphan mode the stationary sensor S1 . . . S9 is only allowed to send critical (high priority) messages to the base station 12 and waits for the association to a radio group or any service maintenance.

Mobile (non-stationary) devices (not depicted) are handled differently, they are allowed to connect to any of the radio groups, but the network manager can freely relocate them if necessary in the light of the actual network load.

Maintenance operations (firmware upgrade, device or group restart) can be effected very efficiently in the system 20. If a stationary sensor S1 . . . S9 goes wrong in a way that it continuously sends messages and blocks the normal operation of the radio group, the respective gateway unit G1 . . . G4 can relocate itself to another free channel. This malfunction is also detected by the network manager, and later when the stationary sensors S1 . . . S9 connect again to the network as orphans it relocates them to a new channel.

When the wired backbone network 13 is a PLN, the system 20 has to handle mains network outages. FIG. 3 represents a possible configuration of a power supply line comprising a power supply transformer 14, and a number of monitored sub-areas A1 . . . A3, e.g. flats, apartments or houses supplied from the power supply transformer 14. The base station 12 is used to coordinate all the power line communication. The same network depicted from the power communication point of view is represented in FIG. 4, In case of a short circuit, an overload circuit breaker unit or a fuse interrupts the circuit, thus the power line connection as well. There is a functionality of the stationary sensors S1 . . . S9 to find a new gateway unit G1 . . . G4 if their gateway unit G1 . . . G4 is not available but this mechanism causes service outage even if it takes a short period of time.

A possible solution to decrease the service outage is that the gateway unit G1 . . . G4 is connected to the supply line before the circuit breaker of the sub-area A1 . . . A3, e.g. flat or apartment. In this way, the main breaker or fuses will interrupt the power supply of the apartment, but the gateway unit G1 . . . G4 will be supplied and can communicate through the power line.

To maintain the power line communication in case of a power interruption at the main power supply of the entire monitored area, e.g. building or campus, it is necessary to use an uninterruptible power supply (UPS) or rechargeable battery sets to provide power for the gateway units G1 . . . G4 and the base station 12 on the network. With this solution the power line communication can be operated even in case of a power supply failure. There are also 3-phased UPS devices that can automatically switch to another, properly functioning phase in case one phase goes out. Most of the bigger facilities have 3-phased power supply so such UPS devices can be easily implemented.

The monitoring system 20 can also comprise further sensors known per se for monitoring vital signs and/or activities of the monitored persons.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A medical monitoring system for monitoring of an area, the system comprising:
a plurality of stationary sensors without time stamping capability, configured to sense events and comprising a wireless output signal broadcast capability for transmitting output signals from the stationary sensors by a wireless communication protocol;
gateway units for receiving the output signals of the stationary sensors, the gateway units connected to a wired backbone network and configured to transmit information relating to the output signals of the stationary sensors by a wired communication protocol on the wired backbone network; and
a base station connected to the wired backbone network, the base station configured to receive the information transmitted by the gateway units on the wired communication protocol and to time-stamp the events signaled by the stationary sensors,
wherein the area comprises sub-areas, wherein a group of stationary sensors are assigned to each of the sub-areas and to a gateway unit directly receiving the output signals of the group of stationary sensors, and wherein the network topology of the stationary sensors, gateway units and base station provides each stationary sensor with substantially the same communication path length to the base station so that the base station time stamps the signaled events in sequence order.

2. The system according to claim 1, wherein the gateway units are configured to transmit information relating to the output signals of the stationary sensors by the wireless communication protocol to the base station in the case of a failure of the wired communication.

3. The system according to claim 1, wherein the wireless communication protocol is ZigBee.

4. The system according to claim 1, wherein the wired communication protocol is Power Line Networking.

5. The system according to claim 1, wherein the stationary sensors are motion sensors.

6. The system according to claim 1, wherein the system is a home or an assisted living monitoring system.

7. A method for monitoring of an area, the method comprising:
applying a plurality of stationary sensors without time stamping capability, the sensors comprising a wireless output signal broadcast capability; and
transmitting output signals from the stationary sensors by a wireless communication protocol to a plurality of gateway units connected to a wired backbone network and configured to transmit information relating to the output signals of the stationary sensors by a wired communication protocol on the wired backbone network to a base station, wherein the plurality of stationary sensors are configured to sense events, and wherein the area comprises sub-areas, to each of the sub-areas is assigned:
   a group of stationary sensors; and
   a gateway unit directly receiving the output signals of the group of the stationary sensors, wherein the events signaled by the stationary sensors to the base station are time-stamped by the base station,
the method further comprising arranging the stationary sensors, gateway units and base station in a network topology that provides each stationary sensor with substantially the same communication path length to the base station so that the base station time stamps the signaled events in sequence order.

8. The method according to claim 7, wherein, in the case of a failure of the wired communication, the plurality of gateway units communicate the information relating to the output signals of the stationary sensors by the wireless communication protocol to the base station.

9. The method according to claim 7, wherein the wireless communication protocol is ZigBee.

10. The method according to claim 7, wherein the wired communication protocol is Power Line Networking.

11. The method according to claim 7, wherein the stationary sensors are motion sensors.

12. The method according to claim 7, wherein the area is a home or an assisted living facility.

\* \* \* \* \*